United States Patent [19]
Favre et al.

[11] 3,924,124
[45] Dec. 2, 1975

[54] ISOTOPE ANALYSIS

[75] Inventors: John A. Favre; Thomas W. Schmidt, both of Bartlesville, Okla.

[73] Assignee: Phillips Petroleum Company, Bartlesville, Okla.

[22] Filed: June 3, 1974

[21] Appl. No.: 475,774

[52] U.S. Cl. ............... 250/281; 250/286; 250/288; 250/514
[51] Int. Cl. ............................................ H01j 39/34
[58] Field of Search ........... 250/288, 281, 282, 283, 250/284, 286, 514, 505

[56] References Cited
UNITED STATES PATENTS 2,951,155  8/1960  Kindred ............................. 250/288
3,536,910  10/1970  Ormrod ............................. 250/514

Primary Examiner—James W. Lawrence
Assistant Examiner—C. E. Church

[57] ABSTRACT

The difference in concentration of a selected isotope in two materials is measured by directing gaseous beams of the materials toward the inlet of a mass spectrometer. A shutter alternately blocks transmission of the two beams. An output signal from the mass spectrometer, which is representative of a selected isotope, is passed to a synchronous detector, as is a reference signal which is representative of the speed of operation of the shutter.

6 Claims, 3 Drawing Figures

ISOTOPE ANALYSIS

It is often desirable to measure differences in concentration of a selected isotope in two materials. For example, such a procedure can be used as an aid in determining if two petroleum samples are derived from a common source. In accordance with this invention, improved apparatus is provided which is capable of making such a measurement. The system is also applicable to the measurement of trace components. Beams of two gas samples to be analyzed are directed in separate paths toward the inlet of a mass spectrometer which is set to measure a selected isotope. A shutter is positioned in the two beams and actuated so that the beams are alternately transmitted. This results in a fluctuating output signal from the mass spectrometer, with alternate half cycles being representative of the concentrations of the measured isotope in each sample. Apparatus is provided to establish a reference signal at the same frequency at which the beams are alternately passed to the mass spectrometer. This reference signal and the output signal of the mass spectrometer are applied to a synchronous detector which establishes a single output signal representative of the difference in concentration between the selected isotope in the two samples.

Figure 1:
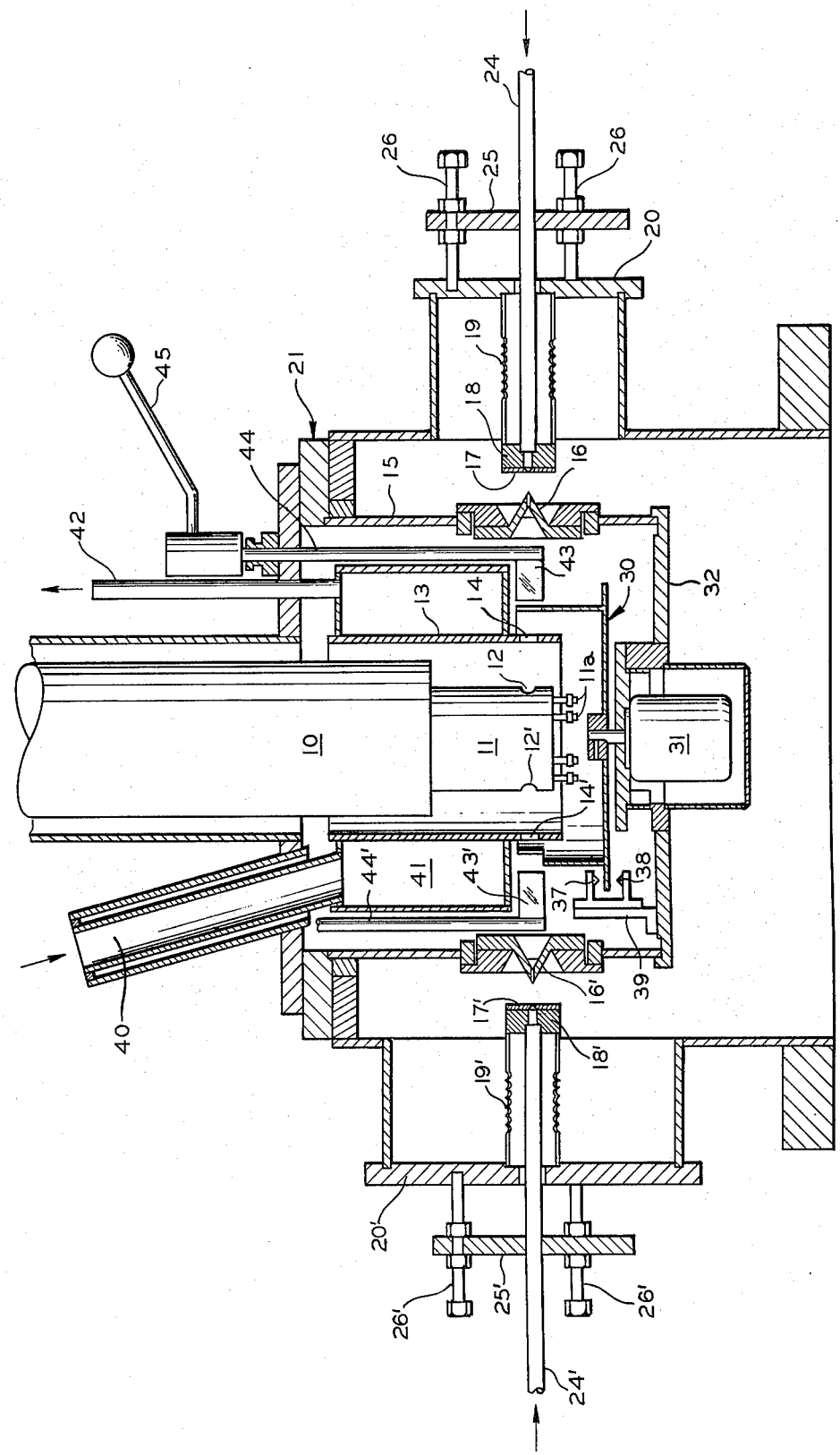
Figure 2:
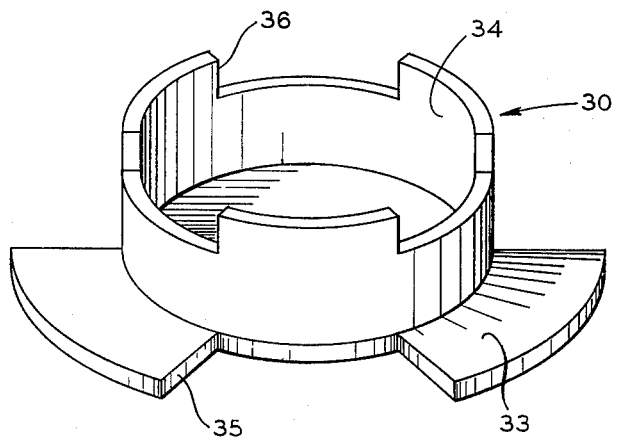
Figure 3:
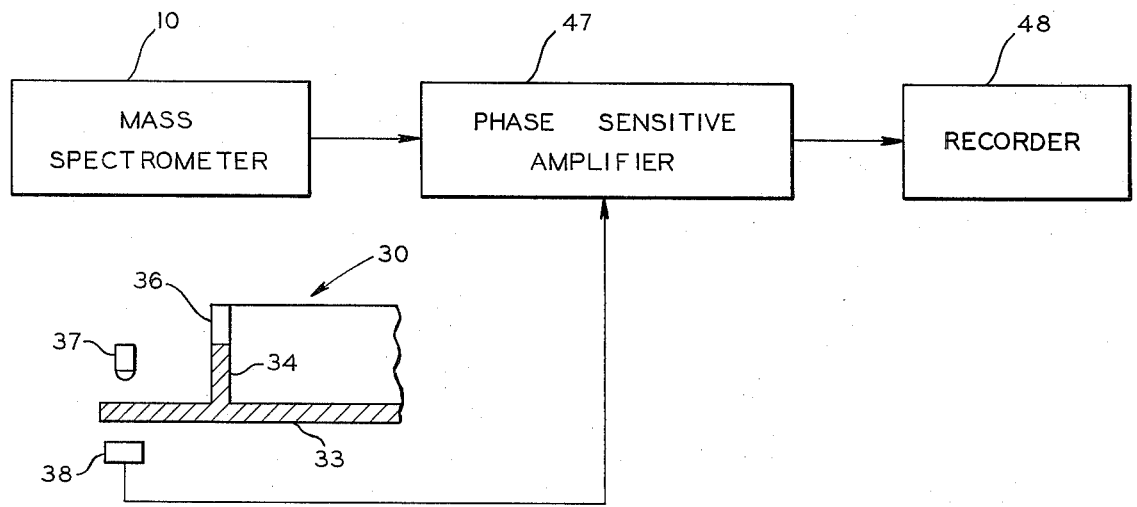

In the accompanying drawing, FIG. 1 is a view, shown partially in section, of an embodiment of the apparatus of this invention. FIG. 2 illustrates the shutter employed in the apparatus of FIG. 1. FIG. 3 is a schematic circuit drawing of the electrical components associated with the apparatus of FIG. 1.

Referring now to the drawing in detail and to FIG. 1 in particular, there is shown a mass spectrometer 10 having a sample inlet section 11. Section 11 is provided with a first opening 12 through which a molecular beam can be introduced into the ionization chamber of the mass spectrometer. Inlet section 11 is surrounded by a sleeve 13 which has an opening 14 therein in alignment with opening 12. Sleeve 13 is surrounded by a sleeve 15 which supports a conical member 16. A small hole is formed in the tip of member 16, which hole can be of a diameter of the order of 15 to 30 mils, for example. A plate 17, which has a central opening therein, is attached to an annular member 18 which is supported by a bellows 19 that extends from a plate 20. The central opening in plate 17 can have a diameter of the order of 1 to 6 mils, for example. Plate 20 is secured to a housing 21 which supports the mass spectrometer and the elements thus far described. A hollow tube 24 extends from member 18 through a plate 25 to which it is attached. Plate 25 is secured to plate 20 by a plurality of adjusting screws 26.

A sample of a first gas to be analyzed is supplied by tube 24. A molecular beam of this gas passes through the opening in plate 17, the opening in the tip of cone 16, and openings 14 and 12 to enter the inlet section of mass spectrometer 10. Adjusting screws 26 permit tube 24 to be aligned so that a narrow beam can pass through the small opening in cone 16.

Inlet section 11 of the mass spectrometer is provided with a second opening 12' on the opposite side from opening 12. Additional elements corresponding to those thus far described are located on this side of the instrument and are designated by corresponding primed reference numerals. These additional elements permit a sample of a second gas to be introduced through tube 24' to enter opening 12' in inlet section 11.

A shutter 30 is rotated by a motor 31 which is supported by a plate 32 that extends across the bottom of sleeve 15. Shutter 30 is illustrated in detail in FIG. 2 as comprising a disk 33 having a sleeve 34 extending upwardly therefrom. Disk 33 is provided with three openings 35 in the periphery thereof, and sleeve 34 is provided with three openings 36. As illustrated, the openings 35 and 36 are offset and are equally spaced, with each extending approximately 60° about the circular shutter. Thus, openings 36 permit molecular beams to be transmitted alternately through openings 14 and 14'. Shutter 30 can be rotated at a speed of 10 to 30 revolutions per second, for example.

A light source 37 and a photocell detector 38 are mounted by a bracket 39, as shown in FIG. 1, so that light is transmitted from source 37 to detector 38 when one of the slots 35 of shutter 30 appears between the two elements. The output signal from detector 38 thus comprises a series of pulses at a frequency corresponding to the frequency at which the molecular beams are alternately transmitted to the mass spectrometer.

The apparatus of FIG. 1 is normally maintained at a relatively low pressure. The gas sample can be introduced through tube 24 at a pressure approximately atmospheric. However, pressures considerably above and below atmospheric can be employed if desired. The interior of housing 21 outside sleeve 15 and plate 32 is connected to a vacuum pump, not shown, so as to reduce the pressure to a value which is generally in the range of $10^{-3}$ to $10^{-7}$ Torr. The interior of sleeve 15 can be connected to a vacuum pump, not shown, to reduce the pressure to a value in the general range of $10^{-5}$ to $10^{-8}$ Torr. A coolant, such as liquid nitrogen, can be introduced through a conduit 40 into a chamber 41 which surrounds sleeve 13. This coolant is vented through a conduit 42. A rotatable shutter 43 is mounted on a rod 44 which is connected to a handle 45 so that the beam entering through cone 16 can be blocked if desired to calibrate the instrument. A similar shutter 43' can be positioned in the beam which enters through cone 16'. Electrical leads to the mass spectrometer can be attached to a series of terminals 11a.

As illustrated in FIG. 3, the output signal of mass spectrometer 10 is applied to the first input of a phase sensitive amplifier 47. The signal from photocell 38 is applied to the second input of the amplifier. Phase sensitive amplifiers are well known in the art. For example, this amplifier can be the Model 840 Autoloc Amplifier described in *Keithley Engineering Notes*, Volume 19, No. 1, of Keithley Instruments, 28775 Auroro Road, Cleveland, Ohio 44139. The output signal of amplifier 47 is applied to a recorder 48.

In operation, the mass spectrometer is set to measure a desired isotope. If the two samples being compared contain the same amount of this isotope, the output signal from the mass spectrometer is constant because the two samples are alternately received. However, a square wave output signal is obtained if one of the samples contains a greater concentration of the isotope than the other. Amplifier 47 serves to amplify the signal which is in phase with the reference signal established by detector 38. The output signal from amplifier 47 is essentially the integral of the amplified square wave signal from the mass spectrometer, so that a D.C. signal is applied to the recorder. The amplitude of this signal is thus representative of the difference in concentration of the selected isotope in the two samples.

While this invention has been described in conjunction with a presently preferred embodiment, it obviously is not limited thereto.

What is claimed is:

1. Analysis apparatus comprising:
    a mass spectrometer having an inlet to receive samples of gas to be analyzed, said mass spectrometer being capable of providing an output signal representative of a selected isotope in a gas sample introduced into the mass spectrometer;
    means to direct a beam of a first gas toward said inlet;
    means to direct a beam of a second gas toward said inlet;
    shutter means positioned in the two beams;
    means to actuate said shutter means so that the two beams are passed to said inlet alternately;
    a phase sensitive detector;
    means to apply said output signal from said mass spectrometer to said detector;
    means responsive to said means to actuate to establish a reference signal of a frequency corresponding to the frequency at which the two beams are alternately passed to said inlet; and
    means to apply said reference signal to said detector.

2. The apparatus of claim 1 wherein said means to establish a reference signal comprises:
    a light source;
    a light detector spaced from said light source;
    second shutter means positioned between said light source and said light detector; and
    means synchronized with said means to actuate the first-mentioned shutter means to actuate said second shutter means so that light is transmitted from said source to said light detector through said second shutter means at a frequency corresponding to the frequency at which the two beams of gas are alternately passed to said inlet.

3. The apparatus of claim 2 wherein the first-mentioned shutter means and said second shutter means comprise a rotatable element having a series of first and second openings therein; said means to direct beams of gas, said light source and said light detector are positioned relative to said rotatable element so that the two beams of gas are transmitted alternately through said first openings and light from said source is transmitted to said light detector alternately through said second openings; and means to rotate said rotatable element at a predetermined speed.

4. The apparatus of claim 1 wherein said phase sensitive detector comprises a phase sensitive amplifier, said output signal and said reference signal are applied to said phase sensitive amplifier, and a recorder connected to the output of said phase sensitive amplifier.

5. The apparatus of claim 1 wherein the two means to direct beams of gas are positioned so that the two beams of gas are passed in converging relationship along a common line toward said inlet, said shutter means comprises a rotatable element positioned within the two beams and having a series of openings therein which are spaced from one another so that one of the beams is transmitted to the inlet when the other is blocked and vice versa, and means to rotate said rotatable element at a predetermined speed.

6. The apparatus of claim 5 wherein said means to establish a reference signal comprises a light source and a light detector spaced from one another so that a portion of said rotatable element is located between the light source and the light detector, said portion of said rotatable element being provided with a series of second openings so that light is alternately transmitted from said light source to said light detector at a frequency corresponding to the frequency at which the two beams are alternately passed to said inlet.

* * * * *